United States Patent
Bakshi et al.

[11] Patent Number: 6,039,999
[45] Date of Patent: Mar. 21, 2000

[54] REDUCED FAT NUT BUTTER PRODUCT AND PROCESS FOR MAKING THE SAME

[75] Inventors: Amarjit S. Bakshi, Yorba Linda; Lakho L. Khatri, Walnut, both of Calif.

[73] Assignee: Hunt Wesson, Inc., Fullerton, Calif.

[21] Appl. No.: 08/380,255

[22] Filed: Jan. 30, 1995

Related U.S. Application Data

[63] Continuation of application No. 08/105,005, Aug. 11, 1993, abandoned.

[51] Int. Cl.[7] .................................................. A23L 1/38
[52] U.S. Cl. ..................... 426/633; 426/516; 426/518; 426/519; 426/573; 426/633; 426/658; 426/804
[58] Field of Search ........................... 426/633, 573, 426/658, 516, 518, 519, 804

[56] References Cited

U.S. PATENT DOCUMENTS

| | | |
|---|---|---|
| 2,302,574 | 11/1942 | Richardson et al. ............. 426/633 |
| 3,619,207 | 11/1971 | Dzurik ............................. 426/633 |
| 4,622,233 | 11/1986 | Torres . |
| 4,728,526 | 3/1988 | Avera ............................... 426/633 |
| 4,814,195 | 3/1989 | Yokoyama ....................... 426/633 |
| 4,839,193 | 6/1989 | Mange et al. .................... 426/633 |
| 5,079,027 | 1/1992 | Wong et al. . |
| 5,164,217 | 11/1992 | Wong et al. . |

FOREIGN PATENT DOCUMENTS

| | | |
|---|---|---|
| 2007961B | 11/1977 | United Kingdom . |
| 9203887 | 11/1992 | WIPO . |

*Primary Examiner*—Helen Pratt
*Attorney, Agent, or Firm*—Pretty, Schroeder & Poplawski

[57] ABSTRACT

Disclosed is a reduced fat peanut butter product containing from about 30% to about 75% of a nut paste, from about 15% to about 45% of at least one water-soluble non-fat dry solid, from about 0% to about 10% added edible oil, from about 0% to about 30% of a water-insoluble non-fat dry solid and from about 0% to about 3% emulsifier. The reduced fat peanut butter is prepared by combining all the ingredients, then, intimately mixing the resulting combination by passing the combination through an extruder mixer. The mixture is then milled and homogenized under a pressure of from about 4,000 psig to about 14,000 psig.

28 Claims, 1 Drawing Sheet

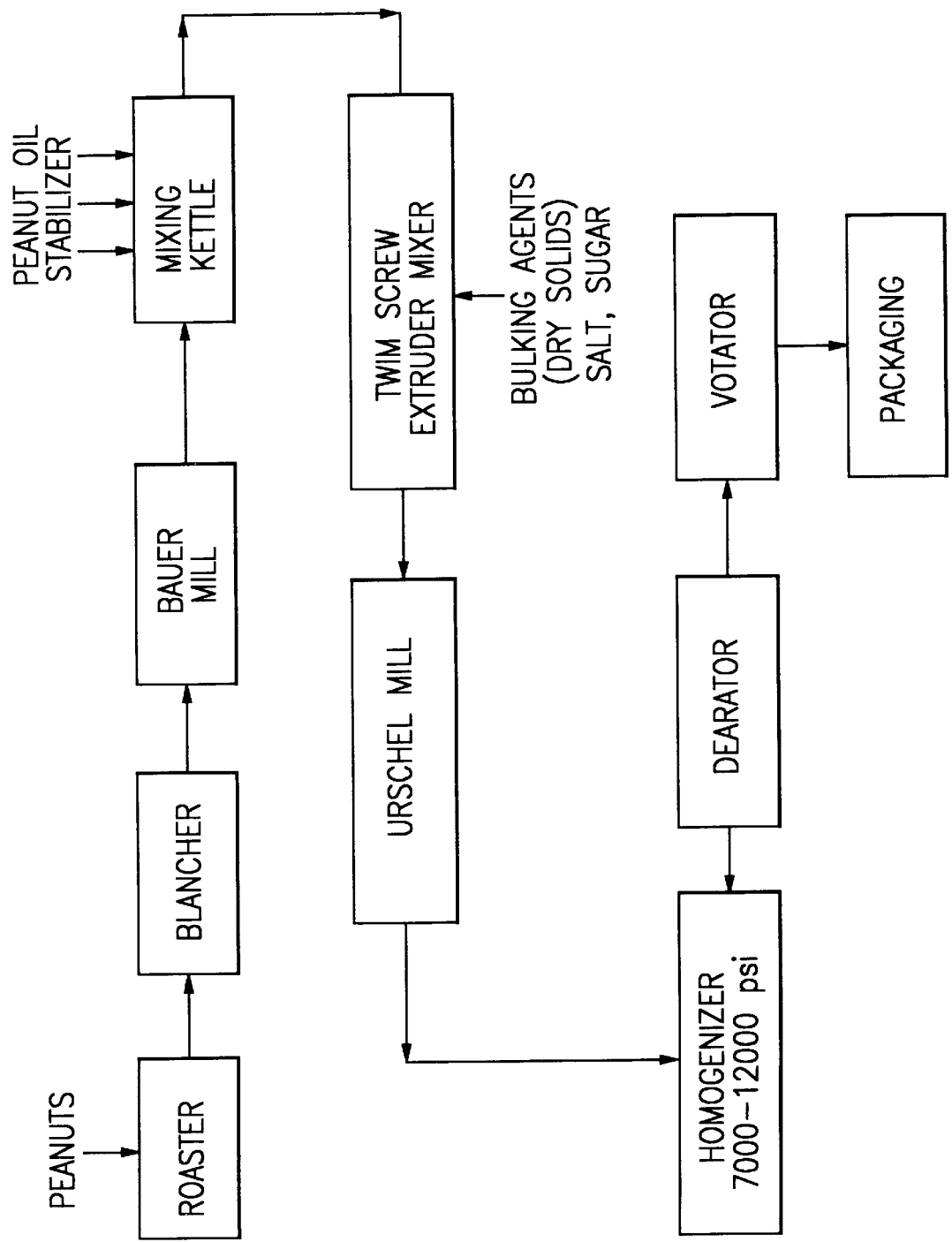

REDUCED FAT NUT BUTTER PRODUCT AND PROCESS FOR MAKING THE SAME

This application is a continuation of application Ser. No. 08/105,005, filed Aug. 11, 1993, now abandoned.

BACKGROUND OF THE INVENTION

1. Field of the Invention

This invention relates to nut butter products, such as peanut butter products, and, in particular, to nut butter products having lower fat values than conventional nut butters.

2. Discussion of the Prior Art

Peanut butter is a popular, highly nutritious food. It is conventionally prepared from shelled peanut kernels roasted at about 170° C. and then cooled to about 30° C. The roasted peanuts are then blanched (i.e. the skins and nibs are removed) and the blanched kernels are split into halves. The blanched, split peanuts are coarsely ground and to the coarsely ground nuts are added optional ingredients, including seasonings, such as salt and sugar, and hydrogenated vegetable oil. All the ingredients are thoroughly mixed and finely ground. The resulting mixture is then cooled and packed in jars.

Color and taste are largely a function of peanut roasting and seasoning addition. The consistency recognized as characteristic of conventional peanut butter spreads, however, derives chiefly form the grinding step. During grinding, the granular peanut meat is transformed into a semi-liquid (visco-plastic) state to form a product having a pasty and spreadable consistency. This occurs largely as a result of particulation of the peanut meat with concurrent rupture of its oil (or fat) cells. Sufficient oil is generally released (although in some instances, supplementary amounts may be added) to form a continuous oil phase which will disperse the finely ground meat particles.

In time, however, part of the oil separates from the product and forms a separate layer on the top of the peanut butter and a rigid crumbly mass underneath. This tendency of peanut butter to separate on standing can be overcome to some extent by the use of stabilizers. Stabilizers are generally partially hydrogenated or highly hydrogenated fats and oils or other emulsifiers.

Peanut butter is a highly nutritious food containing high levels of protein. However, peanut butter also contains relatively large quantities of fat. A chemical analysis of a typical product will show an oil content of 51.1%, a protein content of 29%, and a fiber content of 1–2%. Carbohydrates, including sugars, and moisture normally constitute the rest of the product. Thus, the appeal of peanut butter as a protein source is offset by its high fat value.

In order to reduce the high fat value attempts have been made to replace the fat-containing peanut paste with relatively large amounts of non-fat dry solids. Such attempts, however, have not met with success, because the resulting products are very dry and have a texture that is much different than the texture of conventional peanut butter. The lower the fat content, the harder the product is to spread and the greater is the stickiness perception (the tendency of the peanut butter to adhere or stick to the roof of one's mouth and its resistance to breakdown during chewing).

Another drawback of such attempts is that the incorporation of large amounts of non-fat dry solids involves extensive working of the peanut paste. Not only is the workup time consuming, but it results in a loss of peanut flavor.

Accordingly, there has existed a definite need for nut butter products, such as peanut butter products, having the taste and consistency of conventional nut butters, but with a reduced fat content. There has further existed a need for a relatively quick, simple and inexpensive method for preparing such reduced fat nut butter products. The present invention satisfies these and other needs and provides further related advantages.

SUMMARY OF THE INVENTION

The present invention provides a nut butter product, particularly a peanut butter product, having the taste and consistency of traditional nut butter, but having 10% to 50% less fat and provides a method for preparing such reduced fat products. The reduced fat peanut butter product contains from about 30% to about 75% of a nut paste, from about 15% to about 45% of at least one water-soluble non-fat dry solid, from about 0% to about 10% an added edible oil, from about 0% to about 30% of a water-insoluble non-fat dry solid and from about 0% to about 3% emulsifier. The percentages are weight percentages of the total weight of the nut butter product and total 100%.

The reduced fat nut butter is prepared by combining all the ingredients, then intimately mixing the combination through an extruder mixer, such as a twin screw extruder. Next the mixture is milled and homogenized under a pressure of from about 4,000 psig to about 14,000 psig. There results a nut butter product having less fat than its full fat counterpart, while maintaining the same taste and consistency as the full fat product.

Other features and advantages of the present invention will become apparent from the following detailed description, taken in conjunction with the accompanying drawing, which illustrates, by way of example, the principles of the invention.

BRIEF DESCRIPTION OF THE DRAWING

FIG. 1 is a block diagram outlining the process in accordance with the invention.

DETAILED DESCRIPTION OF THE PREFERRED EMBODIMENTS

The reduced fat nut butter products in accordance with the invention contain from about 10% to about 50% less fat than traditional nut butter products, yet have the taste and consistency of such traditional products. The nut butter products are admixtures of from about 30% to about 75% nut paste and from about 15% to about 45% of at least one water-soluble, non-fat dry solid, from about 0% to about 10% an added edible oil, from about 0% to about 3% stabilizer, from about 0% to about 3% emulsifier, and from about 0% to about 30% water insoluble bulking agent, where the percentages are weight percentages based on the total weight of the nut butter product and total 100%.

Nut butter products are spreadable food products made from nut pastes. Nut butter products include, but are not limited to the terms "peanut butter" and "peanut spread" as the terms are defined by the standards of identity of the U.S. Food and Drug Administration.

Nut pastes useful in accordance with the invention are formed from any suitable nut or oil seed. Representative nuts include peanuts, almonds, pecans, and walnuts. Representative oil seeds include sunflower seeds, sesame seeds, pumpkin seeds and soybeans. Mixtures of these nuts and oils are also useful. Peanut paste is the preferred nut paste.

Any water-soluble, non-fat dry solid compatible with the nut paste and with the use of the product as a food product can be employed in the nut butter product in accordance with the invention. Suitable water-soluble, non-fat dry solids are known in the art, however, heretofore they have not been employed in the amounts necessary to reduce the fat content of the peanut butter product by at least 10%.

Of the water-soluble, non-fat dry solids, flavorants including sugar and salt, are of major importance. Flavorants are agents that contribute to or enhance the flavor of the nut butter. In addition to sugar and salt, flavorants encompass other natural sweeteners and artificial sweeteners, natural and artificial flavors, and other additives that contribute to the flavor of the nut butter product.

Representative natural sweeteners include sugars, such as sucrose, fructose, dextrose, lactose and maltose. Such sweeteners are typically added in amounts from about 0% to about 25%, preferably from about 5% to about 15%, most preferably from about 5% to about 10%.

Representative artificial sweeteners include aspartame, acesuflam, saccharine, cyclamate and glycyrrhizin.

The sweetness of nut butter products containing relatively high levels of sweeteners or artificial sweeteners can be moderated by the addition of other carbohydrates, such as corn syrup solids, isomalt, or maltodextrin. These carbohydrates are typically added in amounts from about 0% to about 45%, preferably from about 15% to about 30%. They are added in an amount sufficient to produce the sweetness equivalent to the addition of from about 1% to about 10% sucrose.

Salt is typically added in amounts from about 0% to about 3%, preferably about 1 to about 2%. Alternatively, salt substitutes such as potassium chloride, sodium chloride/potassium chloride mixtures and seasoned salts can be used.

Additionally, water-soluble, non-fat dry solids can be added as bulking agents. Bulking agents add body or texture to the product and are usually non-nutritive or low calorie materials. The bulking agents are preferably tasteless or have a relatively bland taste and contribute only an insignificant amount of fat to the reduced fat peanut butter products of the invention.

Polydextrose, available from Pfizer, is a suitable water-soluble bulking agent. The polydextrose is preferable neutralized by a compound containing calcium or magnesium as is described in U.S. Pat. No. 4,814,195.

The added edible oil is utilized to modify consistency, generally through the incorporation of a higher or lower melting point oil to adjust the spread texture provided by the nut oil present in the nut paste. The added edible oil is incorporated in amounts up to about 10%, preferably in amounts up to about 3%.

Suitable added edible oils include peanut oil, soybean oil, palm oil, cottonseed oil, coconut oil and walnut oil. For peanut butter products, the preferred edible oil is peanut oil. With other nut butter products, mixtures of edible oils may be preferred, because of the flavor they impart.

The added edible oil can also be a low calorie or zero calorie edible oil. Suitable low calorie or zero calorie edible oils include sucrose polyesters of long chain fatty acids (olestra) and other polyol polyesters of fatty acids, such as are described in U.S. Pat. No. 3,600,186 to Mattson and U.S. Pat. No. 4,005,196 to Jandacek, oils containing at least 10% medium chain triglycerides, such as are described in U.S. Pat. No. 4,863,753 to Hunter, and mixed triglycerides made from medium and long chain saturated and/or unsaturated fatty acids.

The products also contain up to about 3% of a stabilizer to prevent separation of the solid and edible oil phases. Suitable stabilizers are known in the art and include hydrogenated vegetable oils. Suitable stabilizers are disclosed, for example, in U.S. Pat. No. 4,996,074 to Seiden.

The stabilizers generally are triglycerides which are solid at room temperature. They solidify in the nut butter in specific crystalline states and keep the edible oil from separating. Such materials can be combined with a second hydrogenated oil having an iodine value of less than 8, for example, hydrogenated palm oil, canola oil, soybean oil, rapeseed oil, cottonseed oil, coconut oil and the like. Such materials can also be combined with lower melting fat fractions, such as the peanut butter stabilizer disclosed in U.S. Pat. No. 4,341,814.

For peanut butter products preferred stabilizers include hydrogenated rapeseed oil or other hydrogenated triglycerides having a high proportion of fatty acids containing between twenty and twenty-two carbon atoms. Such stabilizers are disclosed in U.S. Pat. Nos. 3,597,230 and 3,192,102.

Water-insoluble non-fat dry solids include solid bulking agents and nutritive materials. Suitable water-insoluble bulking agents include microcrystalline cellulose and other food fibers. Microcrystalline is available under the trademark AVICEL. It is preferably agglomerated to produce a particle size from about 5 to abut 35 microns.

Nutritive materials may include, for example, non-peanut or auxiliary (preferably fat-free) protein such as roast chick peas, triticale, soy, Casein, sunflower seeds, albumin, whey protein or soy protein. These agents benefit the present product by increasing protein content, decreasing fat value and/or improving protein quality.

The present product also benefits from incorporation of an emulsifier. The emulsifier gives increased control over the viscosities of the nut butter products. Exemplary emulsifiers include the polysorbate, glycerol-stearate, glyceride and combinations thereof. Emulsifiers are normally incorporated in amounts up to about 3%, preferably from about 1% to about 2%, by weight.

Referring now to FIG. 1, there is illustrated the process in accordance with the invention. The process involves first preparing a nut paste, beginning with roasting and, in some embodiments, blanching the nuts. Any of the conventional roasting and blanching techniques can be used to prepare the nuts for processing.

Next, the roasted nuts are coarse milled, e.g. milled in a Bauer mill, to produce a nut paste of pumpable consistency. The exact particle size and type of mill used depend upon the particular nut butter product and will be readily determinable by one skilled in the art without undue experimentation.

From about 40% to about 75% of the resulting nut paste is then combined in a mixing kettle with from about 15% to about 45% of the water-soluble non-fat dry solid, from about 0 to about 10% of the added edible oil, from about 0% to about 30% of the water-insoluble non-fat dry solid and from about 0% to about 3% of the emulsifier. The percentages are weight percentages of the total weight of the peanut butter product and total 100%.

In a critical step, the resulting combination is then mixed by passing through an extruder mixer, such as a twin screw extruder, in order that the combination can be intimately mixed, simultaneously with the generation of free nut oil. For example, a twin screw extruder manufactured by Readco is useful in the practice of the method in accordance with the invention.

The twin screw extruder has two parallel shafts containing agitators conforming closely to walls of the shafts. The close clearance between the shafts and the agitators provides an unexpectedly efficacious mixing and cleaning action. As the agitators rotate, a backward-forward motion is provided along with the progressive moving of the combination of nut paste and other ingredients. Now it has been found that the mixing action produces a combination of shear, whipping, folding, stretching and compressing forces that enables relatively large amounts of non-fat dry solids to be incorporated into peanut butter products without adversely affecting the taste and consistency of the resulting product.

The specific conditions for intimately mixing the combination of ingredients depends upon the particular nut butter product. In general, however, it has been found that a clearance of from essentially zero to about 5 mm and preferably from about 1 mm to about 2 mm. The specific combination of clearance, mixing rate and residence time will depend on the size of the extruder and the type of mixing desired. The specific conditions for any particular nut butter product will be readily determinable to one skilled in the art without undue experimentation.

Next the thus produced intimate mixture is fine milled, e.g. in a Urschel mill, to produce a nut butter product having a particle size of about 150 microns. The fine milling is followed by homogenizing. It is important that homogenization takes place under relatively high pressures, i.e. from about 4,000 psig to about 14,000 psig, preferably from about 6,000 psig to about 8,000 psig. Pressures higher than about 10,000 psig yield a smoother and more spreadable product. Currently, however, this advantage is offset by the expense of the extruder necessary to produce such high pressures.

It has been found that the combination of intimate mixing in an extruder mixer and high pressure homogenization produces reduced fat nut butter products having the taste and consistency of their full fat counterparts. It is a further advantage of the method in accordance with the invention that the combination of passing through an extruder mixer followed by high pressure homogenization provides a relatively quick, simple and inexpensive method of incorporating relatively large amounts of non-fat dry solids. Moreover, the method obviates extensive working of the nut paste.

Typically, the nut butter product is then dearated in a conventional dearator to remove residual air from the product. Dearation minimizes the oxidative rancidity of any triglycerides present in the nut butter.

The dearated paste can then be conventionally processed, such as by votating, and packaged.

The following examples are included to further exemplify the invention. They are not limitations thereon.

EXAMPLE I

Example I illustrates the preparation of a reduced fat peanut butter product having the following composition:

| composition: | |
| --- | --- |
| INGREDIENT | % WEIGHT |
| PEANUT PASTE, ROASTED | 69.6 |
| SOY PROTEIN | 6.0 |
| SUGAR | 9.5 |
| SALT, POWDERED | 1.5 |
| STABILIZER | 0.9 |

-continued

| composition: | |
| --- | --- |
| INGREDIENT | % WEIGHT |
| PEANUT OIL | 3.0 |
| CORN SYRUP SOLIDS | 9.5 |
| TOTAL | 100.00 |

The roasted peanut paste was mixed with the peanut oil and sugar in a mixing screw. The corn syrup solids and the soy protein were then added and the resulting combination intimately mixed in a Readco twin screw mixer having five-inch blades. The clearance of the screws was present at the factory for self-cleaning, i.e., was essentially zero. The combination was mixed at 600 lbs/hr for one-half hour. The resulting mixture was then milled to a particle size of 1–2 mil in an Urschel. The fine-ground product was then homogenized at 7000 psig using an APV Gaulin Homogenizer and cooled to 100° F.

The calories, fat, fat calories, % fat calories and the protein of the final peanut butter product are reported below:

|  | 32 Gr | 100 Gr |
| --- | --- | --- |
| CALORIES | 173.0 | 540.0 |
| FAT | 12.0 | 37.8 |
| FAT CALORIES | 109.0 | 340.0 |
| % FAT CALORIES | 63.0 | 63.0 |
| PROTEIN | 8.5 | 26.4 |

The final product contained 26.5%0 non-fat dry solids and a fat reduction of 25%. It had the taste and consistency of a full fat peanut butter product.

EXAMPLE II

Example II illustrates the preparation of a reduced fat peanut butter product produced by the method of Example I, except that the following ingredients were combined:

| INGREDIENT | % WEIGHT |
| --- | --- |
| PEANUT PASTE, ROASTED | 60.5 |
| PROTEIN | 6.4 |
| SUGAR | 13.5 |
| SALT, POWDERED | 1.7 |
| STABILIZER | 0.9 |
| PEANUT OIL | 3.5 |
| CORN SYRUP SOLIDS | 13.5 |
| TOTAL | 100.0 |

The calories, fat, fat calories, % fat calories and the protein of the final peanut butter product are reported below:

|  | 32 Gr | 100 Gr |
| --- | --- | --- |
| CALORIES | 168.0 | 525.0 |
| FAT | 10.8 | 33.9 |
| FAT CALORIES | 97.0 | 305.0 |

-continued

|  | 32 Gr | 100 Gr |
| --- | --- | --- |
| % FAT CALORIES | 58.0 | 58.0 |
| PROTEIN | 7.7 | 24.0 |

The final product contained 35.1% non-fat dry solids and a fat reduction of 33%. It had the taste and consistency of a full fat peanut butter product.

EXAMPLE III

Example III illustrates the preparation of a reduced fat peanut butter product produced by the method of Example I, except that the following ingredients were combined:

| INGREDIENT | combined: % WEIGHT |
| --- | --- |
| PEANUT PASTE, ROASTED | 44.0 |
| PROTEIN | 12.0 |
| SUGAR | 20.0 |
| SALT, POWDERED | 1.3 |
| STABILIZER | 0.7 |
| PEANUT OIL | 3.0 |
| CORN SYRUP SOLIDS | 19.0 |
| TOTAL | 100.0 | and that after grinding in the Urschel mill the combination was homogenized at 14,000 psig using a Rannie APV homogenizer.

The calories, fat, fat calories, % fat calories and the protein of the final peanut butter product are reported below:

|  | 32 Gr | 100 Gr |
| --- | --- | --- |
| CALORIES | 158.0 | 493.0 |
| FAT | 8.0 | 25.1 |
| FAT CALORIES | 72.0 | 226.0 |
| % FAT CALORIES | 45.0 | 45.0 |
| PROTEIN | 7.8 | 24.2 |

The final product contained 52.3% non-fat dry solids and a fat reduction of 50%. It had the taste and consistency of a full fat peanut butter product.

It will, of course, be understood that modifications to the presently preferred embodiments will be apparent to those skilled in the art. Consequently, the scope of the present invention should not be limited by the particular embodiments discussed above, but should be defined only by the claims set forth below and equivalents thereof.

The appended claims are intended to cover all reasonable equivalents and are to be interpreted as broadly as the prior art will permit.

We claim:

1. A method for making a reduced fat nut butter product comprising the steps of:
   (a) combining
      from about 30% to about 75% of a nut paste,
      from about 15% to about 45% of one or more water-soluble, non-fat dry solid,
      from about 0% to about 10% of an added edible oil,
      from about 0% to about 30% of at least one water-insoluble non-fat dry solid, from about 0% to about 3% stabilizer; and
      from about 0% to about 3% emulsifier, where the percentages are weight percentages based on the total weight of the nut butter product;
   (b) intimately mixing the combination by passing it through an extruder mixer simultaneously with the generation of free nut oil; and then
   (c) homogenizing the mixture under a pressure of at least about 4,000 psig.

2. The method in accordance with claim 1, wherein the nut paste is selected from the group consisting of peanut paste, almond paste, pecan paste, walnut paste, sunflower seed paste, sesame seed paste, pumpkin seed paste, soybean seed paste and mixtures thereof.

3. The method in accordance with claim 1 wherein the nut paste is peanut paste.

4. The method in accordance with claim 3 wherein the water-soluble, non-fat dry solid comprises at least one flavorant.

5. The method in accordance with claim 4 wherein the flavorant is selected from the group consisting of salt, natural sweeteners, artificial sweeteners, and mixtures thereof.

6. The method in accordance with claim 5 wherein the natural sweetener is selected from the group consisting of sucrose, fructose, dextrose, lactose, maltose and combinations thereof.

7. The method in accordance with claim 6 wherein the natural sweetener is present in an amount up to about 25%.

8. The method in accordance with claim 5 wherein salt is present in an amount up to about 3%.

9. The method in accordance with claim 3 wherein the stabilizer is a hydrogenated vegetable oil.

10. The method in accordance with claim 3 wherein the water-insoluble, non-fat dry solid is microcrystalline cellulose.

11. The method in accordance with claim 3 wherein the combination is mixed in a twin screw extruder.

12. The method in accordance with claim 11 wherein the twin screw extruder has a clearance of from essentially zero to about 5 mm.

13. The method in accordance with claim 11 wherein the twin screw extruder has a clearance of from about 1 mm to about 2 mm.

14. The method in accordance with claim 11 wherein the mixture is homogenized at a pressure of from about 6,000 to about 8,000 psig.

15. The method in accordance with claim 11 wherein the mixture is homogenized at a pressure greater than about 10,000 psig.

16. The method in accordance with claim 3 wherein the edible oil is selected from the group consisting of peanut oil, soybean oil, palm oil, cottonseed oil, coconut oil, walnut oil and combinations thereof.

17. The method in accordance with claim 16 wherein the edible oil is peanut oil.

18. The method in accordance with claim 1, wherein the nut paste is a peanut paste, the added edible oil is present in an amount from about 3% to about 10% and the emulsifier is present in an amount of from about 1% to about 3%.

19. A method for making a reduced fat nut butter product comprising the steps of:
   (a) combining
      from about 30% to about 75% of a nut paste,
      from about 15% to about 45% of one or more water-soluble, non-fat dry solid, from about 0% to about 10% of an added edible oil,
from about 0% to about 30% of at least one water-insoluble non-fat dry solid,
from about 0% to about 3% emulsifier, where the percentages are weight percentages based on the total weight of the nut butter product;
(b) intimately mixing the combination by passing it through an extruder mixer simultaneously with the generation of free nut oil;
(c) milling the mixture; and then
(d) homogenizing the milled mixture under a pressure of at least about 4,000 psig.

20. The method in accordance with claim 19, wherein the nut paste is a peanut paste, the added edible oil is present in an amount from about 3% to about 10% and the emulsifier is present in an amount of from about 1% to about 3%.

21. A method for making a reduced fat peanut butter product comprising the steps of:
(a) combining
from about 30% to about 75% of a peanut paste,
from about 15% to about 45% of one or more water-soluble, non-fat dry solids,
from about 3% to about 10% of an added edible oil,
from about 6% to about 30% of at least one water-insoluble non-fat dry solid,
from about 1% to about 3% emulsifier, where the percentages are weight percentages based on the total weight of the nut butter product;
(b) intimately mixing the combination by passing it through an extruder mixer simultaneously with the generation of free nut oil; and then
(c) homogenizing the mixture under a pressure of at least about 4,000 psig.

22. The method in accordance with claim 21, wherein the water-soluble, non-fat dry solids comprises from about 5% to about 10% natural sweetener, from about 15% to about 30% other carbohydrate, and from about 1% to about 2% salt.

23. The method in accordance with claim 22, wherein the natural sweetener is sucrose and the other carbohydrate is corn syrup solids.

24. A method for making a reduced fat peanut butter product comprising the steps of:
(a) combining
from about 30% to about 75% of a peanut paste,
from about 15% to about 45% of one or more water-soluble, non-fat dry solids,
from about 3% to about 10% of an added edible oil,
from about 6% to about 30% of at least one water-insoluble non-fat dry solid,
from about 1% to about 3% emulsifier, where the percentages are weight percentages based on the total weight of the nut butter product;
(b) intimately mixing the combination by passing it through an extruder mixer simultaneously with the generation of free nut oil;
(c) milling the mixture; and then
(d) homogenizing the milled mixture under a pressure of at least about 4,000 psig.

25. The method in accordance with claim 24 wherein the water-soluble, non-fat dry solids comprises from about 5% to about 10% natural sweetener, from about 15% to about 30% other carbohydrate, and from about 1% to about 2% salt.

26. The method in accordance with claim 25 wherein the natural sweetener is sucrose and the other carbohydrate is corn syrup solids.

27. A method for making a reduced fat peanut butter product comprising the steps of:
(a) combining
from about 30% to about 75% of a peanut paste,
from about 15% to about 45% of one or more water-soluble, non-fat dry solids,
from about 3% to about 10% of an added edible oil,
from about 6% to about 30% of at least one water-insoluble non-fat dry solid,
from about 1% to about 3% emulsifier, where the percentages are weight percentages based on the total weight of the nut butter product;
(b) intimately mixing the combination by passing it through a twin screw extruder simultaneously with the generation of free nut oil; and then
(c) homogenizing the mixture under a pressure of at least about 6,000 psig.

28. A method for making a reduced fat peanut butter product comprising the steps of:
(a) combining
from about 30% to about 75% of a peanut paste,
from about 15% to about 45% of one or more water-soluble, non-fat dry solids,
from about 3% to about 10% of an added edible oil,
from about 6% to about 30% of at least one water-insoluble non-fat dry solid,
from about 1% to about 3% emulsifier, where the percentages are weight percentages based on the total weight of the nut butter product;
(b) intimately mixing the combination by passing it through a twin screw extruder simultaneously with the generation of free nut oil;
(c) milling the mixture; and then
(d) homogenizing the milled mixture under a pressure of at least about 6,000 psig.

* * * * *